UNITED STATES PATENT OFFICE.

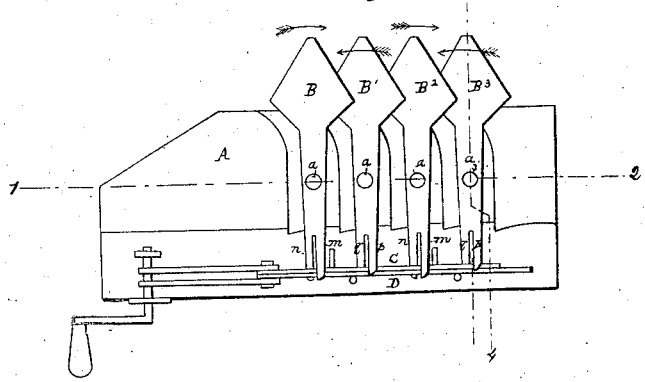
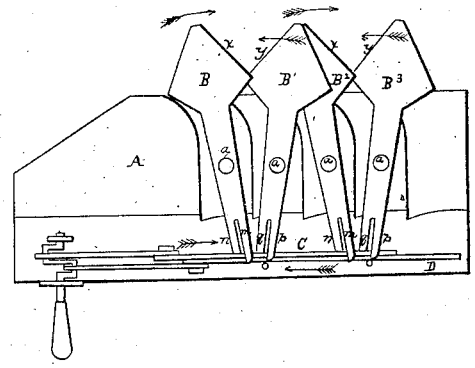
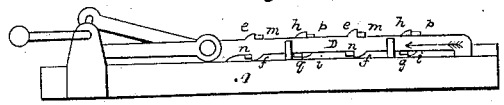
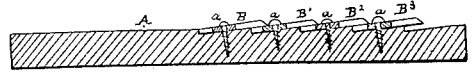
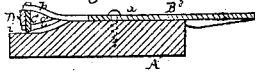

GEO. FETTER, OF PHILADELPHIA, PENNSYLVANIA, ASSIGNOR TO HIMSELF AND EDWD. JONES AND JACKSON P. COMLEY, OF SAME PLACE.

IMPROVEMENT IN CUTTING APPARATUS FOR HARVESTERS.

Specification forming part of Letters Patent No. 27,757, dated April 3, 1860.

*To all whom it may concern:*

Be it known that I, GEORGE FETTER, of the city and county of Philadelphia, and State of Pennsylvania, have invented a new and useful Improvement in Cutting Apparatus for Harvesters; and I do hereby declare the following to be a full, clear, and exact description of the same, reference being had to the accompanying drawings, and to the letters of reference marked thereon.

My invention relates to improvements in arranging and operating the vibrating knives of harvesters; and my improvements consist in so arranging the knives on separate inclined planes formed on the cutter-bar that they will under and overlap each other in the manner described hereinafter; also, in certain reciprocating driving-rods with projections or their equivalents so combined with and arranged in respect to the forked ends of the shanks of the vibrating knives that the said knives shall be moved alternately from a point above and a point below their cutting-plane, thus causing the cutting-edges to be invariably in close contact with each other, and to have that shearing effect on the grain or grass which cannot be attained by the ordinary knives, which move invariably in the same plane, as more fully explained hereinafter.

In order to enable others skilled in this class of machines to make and use my invention, I will now proceed to describe its construction and operation.

On reference to the accompanying drawings, which form a part of this specification, Figure 1 is a plan view of a portion of my improved cutting apparatus for harvesters; Fig. 2, the same with the knives in different position; Fig. 3, a back view of the cutter-bar and driving-rods; Fig. 4, a longitudinal vertical section on the line 1 2, Fig. 1; Fig. 5, a transverse vertical section on the line 3 4, Fig. 1.

Similar letters refer to similar parts throughout the several views.

A is the cutter-bar; B, B', B², and B³, the knives; and C and D, the two driving-rods, to which a reciprocating motion in contrary directions is imparted by any suitable system of rods, cranks, or levers actuated from the driving-shaft of the harvester. On the cutter-bar are formed a series of inclined planes parallel with each other, and best observed on reference to Fig. 4. Each inclined plane is arranged to receive one of the knives, which is hung somewhat loosely to the cutter-bar by a pin or screw, $a$, passing freely through the shank of the knife. By this system of inclined planes knives are made to underlap and overlap each other in the manner seen in Figs. 1 and 2, one cutting-edge of the knife B' overlapping that of the adjacent knife, B², and the other cutting-edge of the same knife being overlapped by that of the knife B, and so on throughout the whole series of knives. The shank of each knife is forked at the end in the manner shown in Fig. 5, one prong being above and the other below the cutting-plane.

The driving-rods C and D (which, as before remarked, have a reciprocating motion in contrary directions imparted to them) are provided above and below with projections arranged to bear against the forked ends of the shanks of the knives in the following manner: The driving-bar D has the upper projections $e$ and lower projections $f$, the former for bearing against the upper prongs $m$ and the latter for bearing against the lower prongs $n\ n$ of the forked ends of the knives B and B². The driving-rod C has also two upper projections $h\ h$ for bearing against the upper prongs $p\ p$ of the forks of the knives B' and B³, the two lower projections $i\ i$ for bearing against the two lower prongs $q\ q$ of the same knives.

Now, supposing the cutting apparatus to be in the position illustrated in Fig. 2, the two knives B' and B² having accomplished their joint cutting action, the pair B and B' and the pair B² and B³ about to commence, each pair their joint cutting action on the grain or grass, the two driving-bars C and D being consequently about to commence their movement in the direction of their respective arrows, Figs. 2 and 3, as the driving-bars move in the direction indicated, the lower projections $f$ on the rod D will bear against the lower prongs $n\ n$ of the forked ends of the knives B and B², thereby tending to move the front ends of these knives in the direction of the arrows. As the force which moves these knives is applied by the projections of the driving-rod to the prongs at a point below their cutting-plane, and as the knives are hung loosely to the cutter-bar, it will be evident that the power thus applied will tend to turn the cutting-edges $x\ x$ of the knives B and B² down onto the surface of the knives B′ and B³. At the same time the last-named knives are moved in the direction of their arrows by the upper projections $h\ h$ of the driving-rod C bearing against the upper prongs $p\ p$ of the said knives, the power being thus applied at a point above the cutting-planes of the knives, their cutting-edges $y\ y$ must necessarily be turned up against the under surface of the adjacent knives.

It will be seen, without further description, that as the knives vibrate they are so tilted that their cutting-edges are in close contact with each other, producing a shearing effect, which tends to sever the stalks of grain or grass with greater facility and at the expense of less power than by the ordinary cutters which move in the same unchanging plane.

I claim as my invention and desire to secure by Letters Patent—

1. Arranging the vibrating knives upon separate inclined planes so formed on the cutter-bar that the said knives may underlap and overlap each other in the manner specified.

2. The driving-bars C and D, with their respective projections or equivalents thereto, in combination with the inclined knives and their forked shanks, the whole being arranged and operating substantially in the manner and for the purpose herein set forth.

In testimony whereof I have signed my name to this specification in the presence of two subscribing witnesses.

GEORGE FETTER.

Witnesses:
HENRY HOWSON,
CHARLES D. FREEMAN.